(12) United States Patent
Li

(10) Patent No.: US 7,631,989 B2
(45) Date of Patent: Dec. 15, 2009

(54) DUAL PARABOLOID REFLECTOR AND DUAL ELLIPSOID REFLECTOR SYSTEMS WITH OPTIMIZED MAGNIFICATION

(75) Inventor: Kenneth K. Li, Castaic, CA (US)

(73) Assignee: Wavien, Inc., Valencia, CA (US)

( * ) Notice: Subject to any disclaimer, the term of this patent is extended or adjusted under 35 U.S.C. 154(b) by 154 days.

(21) Appl. No.: 11/479,032

(22) Filed: Jun. 29, 2006

(65) Prior Publication Data

US 2006/0274438 A1    Dec. 7, 2006

Related U.S. Application Data

(63) Continuation-in-part of application No. 11/274,241, filed on Nov. 14, 2005, which is a continuation of application No. 10/660,492, filed on Sep. 12, 2003, now abandoned, which is a continuation of application No. 09/669,841, filed on Sep. 27, 2000, now Pat. No. 6,634,759.

(60) Provisional application No. 60/695,934, filed on Jun. 30, 2005, provisional application No. 60/192,321, filed on Mar. 27, 2000.

(51) Int. Cl.
*G02B 5/10* (2006.01)
(52) U.S. Cl. ............. 362/298; 362/346; 362/302; 359/853; 359/858
(58) Field of Classification Search ........... 359/365, 359/850, 853, 857, 858, 868, 869; 362/297, 362/298, 302, 346
See application file for complete search history.

(56) References Cited

U.S. PATENT DOCUMENTS

| | | | | |
|---|---|---|---|---|
| 2,018,829 A | * | 10/1935 | Berry | ............ 362/298 |
| 2,721,319 A | * | 10/1955 | Garman et al. | ........... 348/774 |
| 2,819,649 A | * | 1/1958 | McLeod et. al. | ............ 362/298 |
| 4,239,342 A | * | 12/1980 | Aurin et al. | ............ 359/858 |
| 4,357,075 A | * | 11/1982 | Hunter | ............ 359/858 |
| 4,460,939 A | | 7/1984 | Murakami et al. | |
| 4,634,276 A | | 1/1987 | Sharpe et al. | |

(Continued)

FOREIGN PATENT DOCUMENTS

EP    022346    1/1981

(Continued)

OTHER PUBLICATIONS

"Optical axis." The New Penguin Dictionary of Science. 2004. CredoReference. Jun. 25, 2008 <http://www.credoreference.come/entry/7462270>.*

(Continued)

*Primary Examiner*—Stephone B Allen
*Assistant Examiner*—Jennifer L. Doak
(74) *Attorney, Agent, or Firm*—Fulbright & Jaworski LLP

(57) ABSTRACT

A condensing and collecting optical system comprises two asymmetric reflectors. The first and second reflectors comprise a portion of an ellipsoid or paraboloid of revolution having parallel optical axis. A source of electromagnetic radiation is placed at one of the focal points of the first reflector to produce radiation that is received by the second reflector, which focuses the radiation toward a target. To achieve maximum output coupling efficiency, the second reflector has a different focal length than the first reflector such that the radiation inputted to the target has lower angle of incidence.

36 Claims, 7 Drawing Sheets

U.S. PATENT DOCUMENTS

| | | | |
|---|---|---|---|
| 4,757,431 A | | 7/1988 | Cross et al. |
| 4,765,733 A | | 8/1988 | Negishi et al. |
| 5,042,931 A | | 8/1991 | Mourier et al. |
| 5,414,600 A | | 5/1995 | Strobl et al. |
| 5,430,634 A | | 7/1995 | Baker et al. |
| 5,477,394 A | * | 12/1995 | Shibazaki .................... 359/858 |
| 5,515,242 A | | 5/1996 | Li |
| 5,707,131 A | | 1/1998 | Li |
| 5,749,642 A | | 5/1998 | Kimura et al. |
| 5,838,479 A | * | 11/1998 | Shiraishi .................... 359/204 |
| 6,142,659 A | | 11/2000 | Suzuki et al. |
| 6,144,412 A | | 11/2000 | Hirano et al. |
| 6,253,006 B1 | | 6/2001 | Heimer |
| 6,874,923 B2 | | 4/2005 | Albou et al. |
| 2005/0152154 A1 | | 7/2005 | Strambersky et al. |

FOREIGN PATENT DOCUMENTS

| | | |
|---|---|---|
| EP | 0 562 873 A | 9/1993 |
| EP | 0642047 | 3/1995 |
| GB | 2021805 | 12/1979 |
| GB | 2201527 A | 9/1988 |
| WO | WO-98/39684 | 9/1998 |

OTHER PUBLICATIONS

"Optical axis." Hargrave's Communications Dictionary, Wiley. 2001. CredoReference. Jun. 25, 2008 <http://www.credoreference.com/entry/2723171>.*

Merriam-Webster's Collegiate Dictionary 897 (11th ed. 2003).*

* cited by examiner

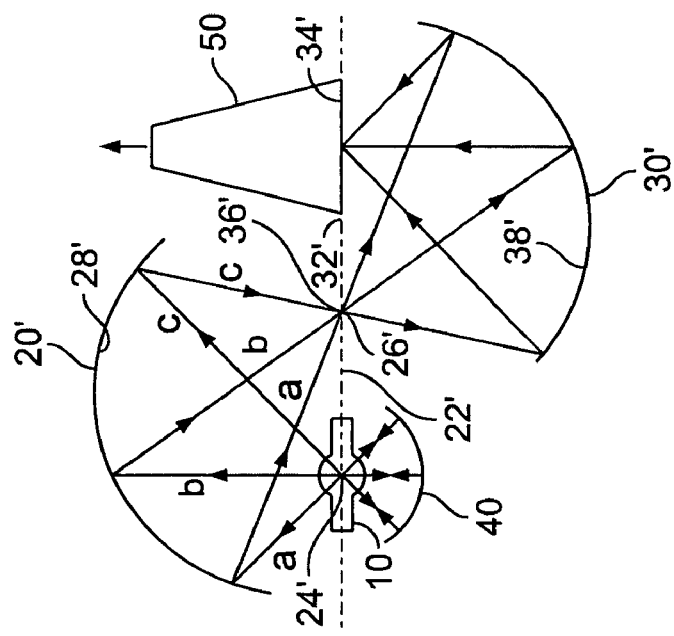
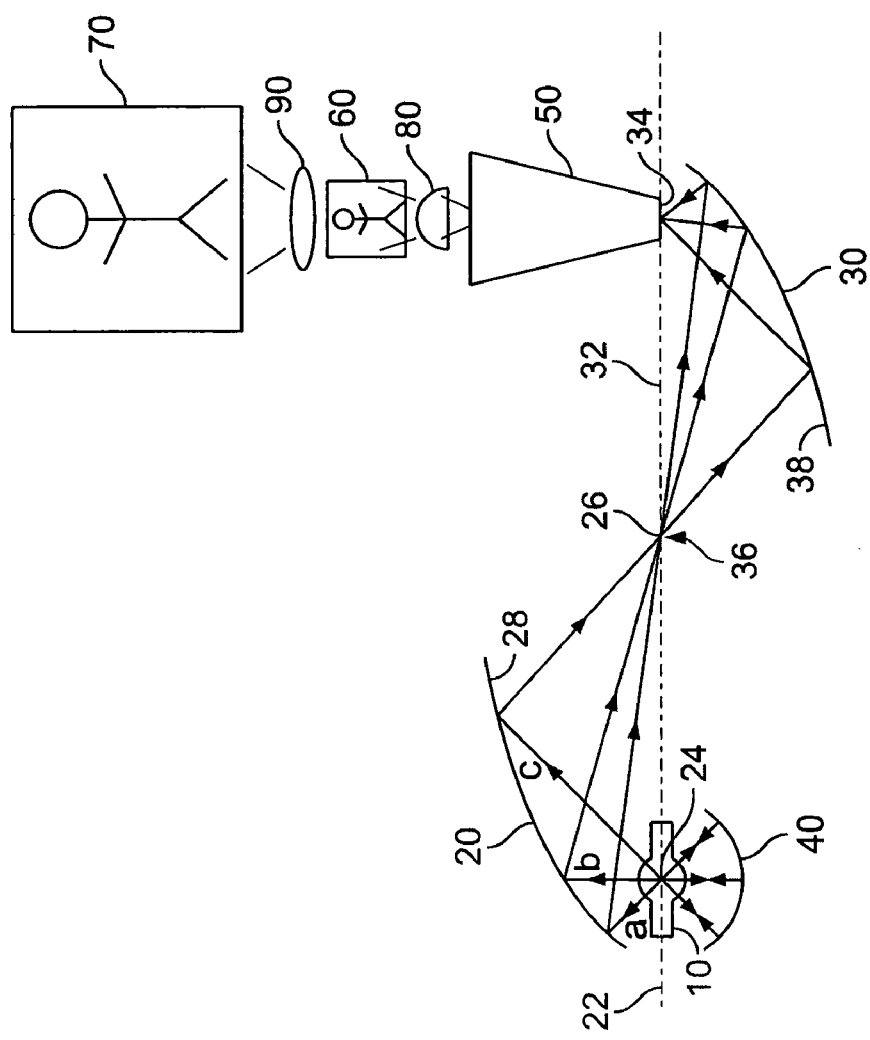
FIG. 6
FIG. 5

DUAL PARABOLOID REFLECTOR AND DUAL ELLIPSOID REFLECTOR SYSTEMS WITH OPTIMIZED MAGNIFICATION

RELATED APPLICATIONS

This application claims the benefit of U.S. Provisional Application Ser. No. 60/695,934 filed Jun. 30, 2005 and is a continuation-in-part of application Ser. No. 11/274,241, filed Nov. 14, 2005, which is a continuation of application Ser. No. 10/660,492, filed Sep. 12, 2003, now abandoned which is a continuation of application Ser. No. 09/669,841, filed Sep. 27, 2000 (now U.S. Pat. No. 6,634,759), which claims the benefit of U.S. Provisional Application No. 60/192,321 filed Mar. 27, 2000, each of which is incorporated herein by reference in its entirety.

FIELD OF THE INVENTION

This invention relates to systems for collecting and condensing electromagnetic radiation, particularly a system incorporating asymmetric parabolic reflectors for collecting radiation emitted from a radiation source and focusing the collected radiation onto a target.

BACKGROUND OF THE INVENTION

The functional objective for systems that collect, condense, and couple electromagnetic radiation into a waveguide, such as a single fiber or fiber bundle, or outputs to a homogenizer of a projector, is to maximize the brightness (i.e., maximize the flux intensity) of the electromagnetic radiation at the target. The prior art teaches the use of so-called on-axis reflector systems involving spherical, ellipsoidal, and parabolic reflectors and off-axis reflector systems involving spherical, toroidal, and ellipsoidal reflectors. Where the target has dimensions that are similar to the size of the arc gaps of the electromagnetic radiation source, off-axis reflector systems achieve higher efficiency and brightness at the target than on-axis systems, thereby maximizing the amount of light that can be collected by a fiber optic target. For targets having dimensions that are much larger than the arc gaps of the electromagnetic source, both on-axis and off-axis reflector systems are effective for collecting, condensing, and coupling the radiation from a radiation source into a wave guide.

An optical collecting and condensing system comprises various optical elements, such as reflectors and lenses that receives lights energy from a light source, such as a light bulb, and directs the light energy toward a target. In particular, the optical system collects and condenses electromagnetic radiation to couple the light energy to a standard waveguide, such as a single fiber or fiber bundle or to output the light energy to a homogenizer of a projector. The functional objective for the optical system is to maximize the brightness (i.e., the flux intensity) of the electromagnetic radiation at the target.

Optical systems for collecting and condensing light from a light source are generally classified as either "on-axis" or "off-axis." In the on-axis systems, the reflectors are positioned on the optical axis between light source, and the target. FIG. 1 illustrates a known on-axis optical system that uses a paraboloid reflector with an imaging lens. The paraboloid reflector has the feature that light energy emanating from a focus is substantially collimated to travel parallel to the optical axis. The optical system of FIG. 1 uses this feature of the paraboloid reflector by positioning the light source at the focus in order to collimate the light from the light source. A condensing lens positioned in the optical stream receives the substantially collimated light energy and redirects the light energy toward the target. In this way, the light energy is collected and condensed at the target. The use of the paraboloid reflector further allows the use of various types of optical filters to improve the performance and durability of the optical system. However, the divergence of the light varies continuously along the reflector, with rays traveling near the optical axis having the greatest divergence. As a result, the magnification of the system varies along the different paths taken by the light emitted from the light source, causing degradation of the brightness of the system. Moreover, the focusing lens produces a distorted image even under perfect conditions and under actual operation typically produces badly aberrated images which effectively increase the image size and reduce flux intensity at the target.

FIG. 2 illustrates another known on-axis optical system. This system uses an ellipsoidal reflector, which ahs the feature that all light emanating from one focal point is directed to a second focal point. The optical system of FIG. 2 uses an ellipsoidal reflector with a light source placed at the first focus and a target placed at the second focus. As in the previous system, the on-axis ellipsoidal system suffers from brightness degradation caused because the divergence of the light varies continuously along the reflector, with rays traveling near the optical axis having the greatest divergence.

Overall, on-axis systems generally suffer from the basic limitations of losing brightness in the coupling, thus degrading the overall efficiency of the optical illumination and projection system. In particular, the divergence of the reflected beam in known on-axis systems is undesirably dependent on the angle of emission from the radiation source. Additionally, the outputs of the on-axis system are substantially circular and symmetric and, therefore, may not be suitable for non-circular targets, such as a rectangular homogenizer for use in projection.

The off-axis optical collecting systems, the reflectors are positioned off the optical axis between the light source and the target. For example, FIG. 3 illustrates an optical system in which the light source is positioned at a focal point of a retro-reflector and the target is positioned on a focal point of a primary reflector, but the reflectors are positioned off the optical axis between the light source and the target. In the illustrated optical system, light energy from the light source reflects from the retro-reflector and travels to the primary reflector. The optical energy then reflects from the primary reflector and converges at the target.

With the off axis system of FIG. 3, the magnification is very close to 1-to-1 for all angles of light when the numerical aperture of the system is small. When the system uses mirrors having higher numerical apertures (e.g., attempts to collect more light energy from the same light source) the larger angle light rays are reflected with high divergence angles, causing the magnification to deviate from 1-to-1. Again, the magnification reduces the brightness at the target and overall decreases the performance of the optical system. The amount of deviation in the magnification depends on the size of the mirror, the radius of curvatures, and the separation of the arc lamp and the target. Accordingly, the off-axis configuration of FIG. 3 is more suitable for applications that use smaller numerical apertures.

Different off-axis optical systems are also known. For example, U.S. Pat. No. 4,757,431 ("the '431 patent") provides a condensing and collecting system employing an off-axis spherical concave reflector which enhances the maximum flux intensity illuminating a small target and the amount of collectable flux density by the small target. Enhancements to the optical system of the '431 patent are provided by U.S.

Pat. No. 5,414,600 ("the '600 patent"), in which the off-axis concave reflector is an ellipsoid, and by U.S. Pat. No. 5,430,634 ("the '634 patent"), in which the off-axis concave reflector is a toroid. Although the toroidal system described in the '634 patent corrects for astigmatism, and the ellipsoidal system of the '600 patent provides a more exact coupling than the spherical reflector of the '431 patent, each of these systems requires the application of an optical coating onto a highly curved reflective surface, which is relatively expensive and difficult to apply in a uniform thickness.

Overall, the known off-axis optical systems provide a generally near 1-to-1 (i.e., magnification free) image of the light source at the target and conserve brightness. However, in the known off-axis systems, the magnification deviates from 1-to-1 as the amount of light collected is increased by increasing the collection angle of the reflector. Thus, as a greater portion of light energy from a light source is collected to increase optical intensity, the overall performance of the optical system degrades.

To address problems in the known optical collection and condensing systems, U.S. Pat. No. 6,672,740 provides an on-axis, dual paraboloid reflector system that is advantageous in many respects to other known systems, including the achievement of near 1-to-1 magnification for small-sized light source. This optical collection and condensing system, as illustrated in FIG. 4, uses two generally symmetric paraboloid reflectors that are positioned so that light reflected from the first reflector is received in a corresponding section of the second reflector. In particular, light emitted from the light source is collected by the first paraboloid reflector and collimated along the optical axis toward the second reflector. The second receives the collimated beam of light and focuses this light at the target positioned at the focal point.

To facilitate the description of this optical system, FIG. 4 includes the light paths for three different rays (a, b, and c) emitted from the light source. Ray a travels a relatively small distance before intersecting the first parabolic reflector, but the divergence of ray a at the first parabolic reflectors is relatively large. In contrast, ray c travels further between the light source and the first parabolic reflector but has a smaller relative divergence at the first parabolic reflector. Ray b, positioned between rays a and c, travels an intermediate distance before intersecting the first parabolic reflector and has an intermediate divergence. In this optical system, due to the symmetry of the two parabolic reflectors, the rays a, b, and c are reflected at corresponding positions in the second parabolic reflector such that the distance for each ray between the second parabolic reflector and the target is the same as the distance between the light source and the first parabolic reflector. In this way, the second reflector compensates for the divergence. Consequently, the optical system collects and condenses light energy from the light source with a near 1-to-1 magnification and preserves the brightness of the light source.

The optical system of FIG. 4 may further employ a retro-reflector in conjunction with the first paraboloid reflector to capture radiation emitted by the source in a direction away from the first paraboloid reflector and reflect the captured radiation back through the source. In particular, the retro-reflector has a generally spherical shape with a focus located substantially near the light source (i.e., at the focal point of the first paraboloid reflector) toward the first paraboloid reflector to thereby increase the intensity of the collimated rays reflected therefrom.

Since on-axis, dual-paraboloid optical system arises because the light source is very close to the apex side of the reflector in the above described on-axis, dual-paraboloid optical system, the system produces a large angle of divergence near the light source (i.e., along the paths similar to ray a). In particular, a large angle of divergence causes light energy traveling along a path similar to ray a to compass a relatively large area on the second paraboloid reflector, thus producing unwanted aberrations and a loss of brightness. None of these references, however, describe a system for dealing with large angle of divergence and optimizing magnification between the source and the focused image so as to obtain the maximum flux intensity with the minimum distortion at the target.

Therefore, there remains a need to provide a method of collecting and concentrating electromagnetic radiation using asymmetric parabolic reflectors that maximizes the flux intensity of the focused radiation beam at the target.

SUMMARY OF THE INVENTION

In accordance with an embodiment of the present invention, an improved system for collecting and condensing electromagnetic radiation employs opposing asymmetric reflectors and optimizes magnification between a source image and a focused image at a target, thereby producing maximum focused intensity at the target. In particular, the present invention is directed to an optical device for collecting electromagnetic radiation from a source of electromagnetic radiation and focusing the collected radiation onto a target to be illuminated with at least a portion of the electromagnetic radiation emitted by the source. The device comprises a first and second reflectors, each reflector generally comprising at least a portion of a paraboloid or ellipsoid of revolution and has an optical axis A and a focal point on the optical axis A. A source located proximate the focal point of the first reflector produces collimated rays of radiation reflected from the first reflector in a direction parallel to the optical axis A. The second reflector comprises at least a portion of a paraboloid or ellipsoid of revolution and has an optical axis B and a focal point on the optical axis B. The second reflector is positioned and oriented with respect to the first reflector so that the rays of radiation reflected from the first reflector are reflected by the second reflector and focused toward a target located proximate the focal point of the second reflector. The first and second reflectors have slightly different shapes and sizes. Alternatively, the second reflector is positioned and oriented with respect to the first reflector so that the rays of radiation reflected from the first reflector converge at a focal point of the second reflector. The rays of radiation then continue until reflected by the second reflector and focused toward a target located proximate a second focal point of the second reflector. The first and second reflectors can be oriented optically about asymmetrically with respect to each other to optimize magnification.

A retro-reflector may be used in conjunction with the first reflector to capture radiation emitted by the source in a direction away from the first reflector and reflect the captured radiation back through the source (i.e., through the focal point of the first reflector) toward the first reflector to thereby increase the intensity of the rays reflected therefrom.

The first and second reflectors can be arranged in an opposed, facing relationship with their respective optical axes arranged in parallel with respect to each other, or they can be arranged with their optical axes arranged at an angle with respect to each other, in which case a redirecting reflector is employed to redirect the rays reflected by the first reflector toward the second reflector.

In accordance with an exemplary embodiment of the present invention, the first and second reflectors comprise an asymmetric ellipsoid/hyperboloid pair with one of the first and second reflectors having a substantially ellipsoid shape, and the other of the first and second reflectors having a corresponding substantially hyperboloid shape with each reflector of the ellipsoid/hyperboloid pair having a corresponding size and optical orientation with respect to each other so that each ray of radiation reflected by a surface portion of the first reflector is reflected by a corresponding surface portion of the second reflector toward the target so as to preferably optimize magnification between the source and an image focused onto the target.

In accordance with an exemplary embodiment of the present invention, an optical device for illuminating a target with rays of electromagnetic radiation comprises a first reflector and a second reflector. The first reflector comprises a first focal length, a first focal point and a first optical axis, the rays of electromagnetic radiation being directed substantially proximate to the first focal point of the first reflector. The second reflector comprising a second focal length, a second focal point and a second optical axis, which is not coincident with the first optical axis. The second reflector being positioned and oriented with respect to the first reflector to receive at least a portion of the rays of radiation reflected from the first reflector and reflect the portion of the rays of radiation to a target located substantially proximate to the second focal point of the second reflector. The second reflector being asymmetric with respect to the first reflector.

In accordance with an exemplary embodiment of the present invention, the focal length of the second reflector is longer than the focal length of the first reflector, which lowers the incidence angle of the rays of radiation inputted to the target, thereby reducing the Fresnel reflection loss.

In accordance with an exemplary embodiment of the present invention, the asymmetric characteristics of the first and second reflectors are selected to maximize net output coupling efficiency.

In accordance with an exemplary embodiment of the present invention, the focal length difference between the focal lengths of the two reflectors is selected to optimize the tradeoff between Fresnel reflection loss and image aberration, thereby providing a maximum net output coupling efficiency.

In accordance with an exemplary embodiment of the present invention, an optical device for illuminating a target with rays of electromagnetic radiation comprises a first reflector and a second reflector. The first reflector comprises a first focal length, a first focal point, a second focal point, and a first optical axis. The rays of electromagnetic radiation being directed substantially proximate to the first focal point of the first reflector to reflect from the first reflector and substantially converge at the second focal point. The second reflector comprising a second focal length, a first focal point and a second focal point and a second optical axis, which is not coincident with the first optical axis. A target being located substantially proximate to the first focal point of the second reflector to receive at least a portion of the rays of radiation that pass through the second focal point of the second reflector and are reflected by the second reflector to substantially converge at the first focal point of the second reflector. The second reflector being positioned and oriented with respect to the first reflector such that the second focal point of the first reflector and the second focal point of the second reflector are positioned substantially proximate. The second reflector being asymmetric with respect to the first reflector, which optimizes net output coupling efficiency.

In accordance with an exemplary embodiment of present invention, a method for collecting rays of electromagnetic radiation and focusing the collected rays of electromagnetic radiation onto a target. The method comprises the steps of directing the rays of electromagnetic radiation substantially proximate to a focal point on a first optical axis of a first reflector; positioning and orienting a second reflector with respect to the first reflector to receive at least a portion of the rays of radiation reflected from the first reflector; and positioning the target proximate to a focal point of the second reflector to receive at least portion of the rays of radiation reflected from the second reflector, wherein the second reflector being asymmetric with respect to the first reflector to effectively reduce Fresnel reflection loss.

In accordance with an exemplary embodiment of the present invention, a method for collecting rays of electromagnetic radiation and focusing the collected rays of electromagnetic radiation onto a target. The method comprising the steps of: directing the rays of electromagnetic radiation substantially proximate to a first focal point on a first optical axis of a first reflector so that the first reflector substantially converges the rays of radiation reflected from the first reflector at a second focal point on the first optical axis; positioning a second reflector so that a first focal point on a second optical axis of the second reflector is substantially proximate with the second focal point of the first reflector, whereby the converging rays of radiation reflected from the first reflector pass through the first focal point of the first reflector and are redirected by the second reflector toward a second focal point on the second optical axis; and positioning the target proximate to the second focal point of the second reflector, wherein the second reflector being asymmetric with respect to the first reflector to effectively reduce Fresnel reflection loss.

Filters or other optical elements can be arranged between the collimating and focusing reflectors.

The shape of the first and second reflectors may deviate from an ellipsoid or a paraboloid as needed by the system. Similarly, the first and second reflectors may have a toroidal or spherical shape that approximate an ellipsoid.

DESCRIPTION OF THE DRAWINGS

Embodiments of the present invention will be described with reference to the attached drawings in which like components or features in the various figures are represented by like reference numbers:

FIG. 5 is a schematic diagram, shown in cross-section, of an off-axis condensing and collecting optical system using two ellipsoidal reflectors in accordance with an exemplary embodiment of the present invention;

FIG. 6 is a schematic diagram, shown in cross-section, of a condensing and collecting optical system using two reflectors of greater eccentricity in accordance with an exemplary embodiment of the present invention;

DETAILED DESCRIPTION OF EXEMPLARY EMBODIMENTS

Figure 1:
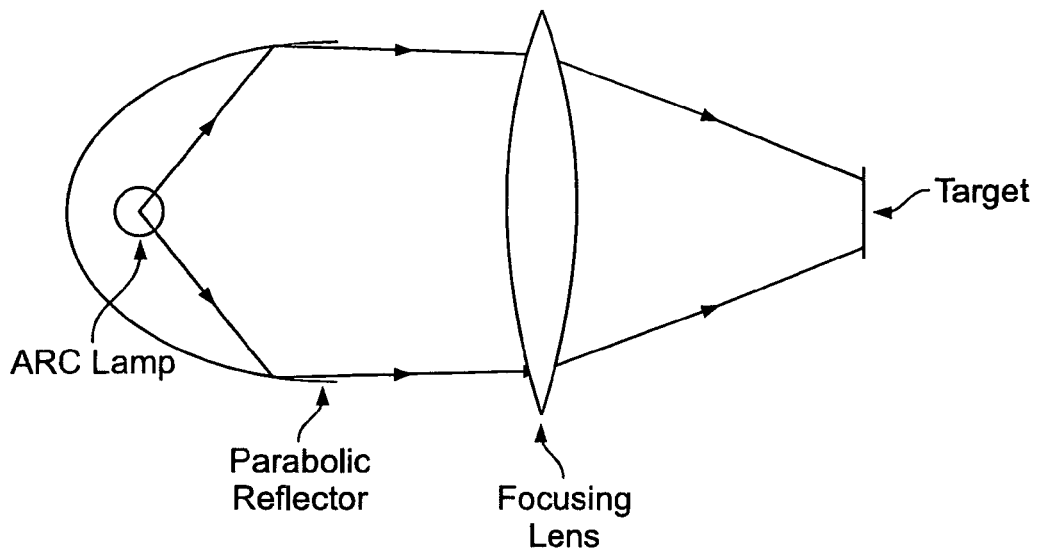
FIG. 1 is a schematic diagram, shown in cross-section, of a known on-axis condensing and collecting optical system that uses a paraboloid reflector and a focusing lens.
Figure 2:
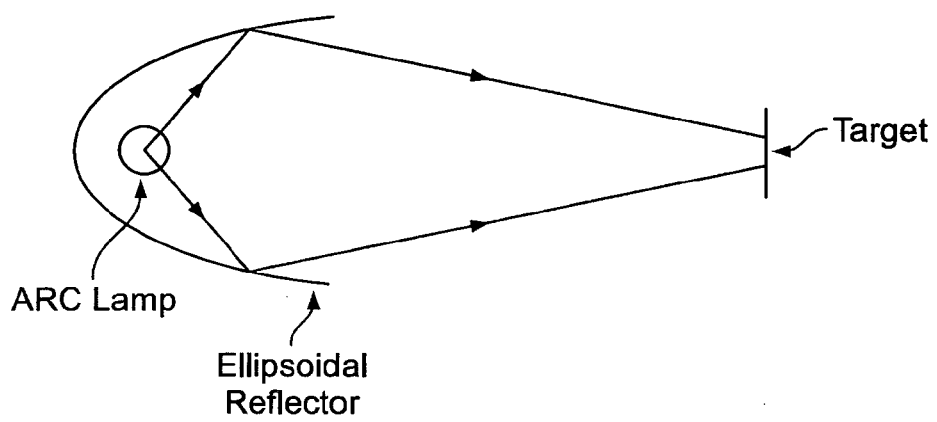
FIG. 2 is a schematic diagram, shown in cross-section, of a known on-axis condensing and collecting optical system that uses an ellipsoidal reflector.
Figure 3:
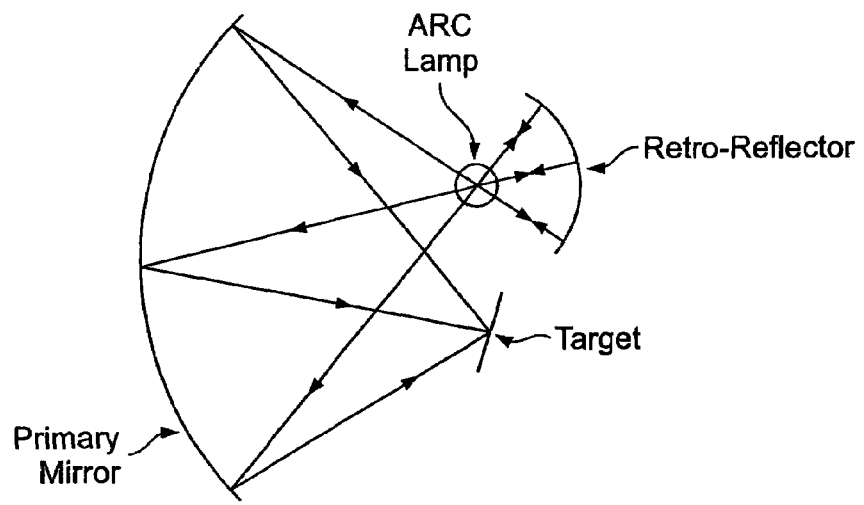
FIG. 3 is a schematic diagram, shown in cross-section, of a known off-axis condensing and collecting optical system.

With reference to the figures, exemplary embodiments of the invention are now described. These embodiments illustrate principles of the invention and should not be construed as limiting the scope of the invention.

Referring to FIGS. 5-6 and 8-10 as showing representative exemplary embodiments of the present invention, the invention has associated therewith the following four main components: an electromagnetic source 10, a first reflector 20, a second reflector 30 and a target or tapered light pipe (TLP) 50.

The electromagnetic source 10 is preferably a light source having an envelope. Most preferably, the source 10 comprises an arc lamp such as a xenon lamp, a metal-halide lamp, a HID lamp, or a mercury lamp. For certain applications, filament lamps, e.g., halogen lamps, can be used, provided the system is modified to accommodate the non-opaque filaments of the lamp, as will be described in more detail below. However, any source of electromagnetic radiation which is of similar size to or smaller than the target may be used (e.g., fiber, filament lamp, gas discharge lamp, laser, LED, semiconductor, etc.).

The size of the electromagnetic source here is better defined by the 1/e intensity of the intensity contour map which characterizes the brightness (flux density over angular extent) of the source. Brightness is related to the size of the arc gap and determines the theoretical limit of coupling efficiency. For the specific case of an arc lamp, the contour approximates axial symmetry and is a complex function of electrical rating, electrode design and composition, gas pressure, arc gap size, and gas composition. For the specific case of an arc lamp having an aspherical curved envelope, the effective relative position and intensity distribution of the source imaged by the reflector undergoes aberration. This is caused by the shape of the envelope which essentially functions as a lens and requires a compensating optical element. Optical compensation can be achieved either by modifying the design of the reflector to compensate for the astigmatism caused by the envelope or by inserting a correcting optic between the source and the target. Additionally, optical coatings can be applied to the envelope to minimize Fresnel reflections and thereby maximize collectable radiation at the target or to control and/or filter the radiation flux.

The first reflector 20 comprises a portion of an ellipsoid or a paraboloid of revolution having an optical axis 22 and focal points 24 and 26. The first reflector 20 preferably has a reflective coating 28 (e.g., aluminum or silver) and the surface is highly polished. For certain applications, the first reflector 20 can be made from glass coated with a wavelength-selective multi-layer dielectric coating. For example, the coating 28 may be a cold coating with high reflectivity only in the visible wavelengths for use in visual light applications. With the source 10 placed at the first focal point 24 of the first reflector 20, electromagnetic radiation that contacts the first reflector 20 is reflected as a beam of energy that converges the second focal point 26 of the first reflector 20. Where the source 20 is an arc lamp, the arc gap is preferably small compared to the focal length of the first reflector 20.

The second reflector 30 comprises a portion of an ellipsoid or a paraboloid of revolution having an optical axis 32 and focal points 34 and 36. The second reflector 30 may also have a coating 38, as described above to selectively reflect light energy. The second reflector 30 can differ in shape or size from first reflector 20. That is, the first and second reflectors are asymmetric with respect to each other.

The second reflector 30 is positioned and oriented so that the electromagnetic radiation reflected by the first ellipsoidal reflector 20 converges at the second focal point 36 of the second reflector 30. The radiation continues until impinging the surface of the second reflector 30 and is thereafter focused toward the first focal point 34 of the second reflector 30. In order to optimizes magnification between the first reflector 20 and the second reflector 30 (i.e., a focused image that is substantially the same size as the source), it is important that each ray of electromagnetic radiation reflected and focused by a surface portion of the first reflector 20 be reflected and focused by a substantially corresponding surface portion of the second reflector 30 in order to achieve a focus at the first focal point 34 that is of the maximum possible brightness. In the context of the present disclosure, orienting and positioning the first reflector 20 and the second reflector 30 with respect to each other so that each ray of electromagnetic radiation collimated by a surface portion of the first reflector 20 is focused by a substantially corresponding surface portion of the second ellipsoidal reflector 30.

The target 50 is a small object requiring illumination with the highest intensity possible. In an exemplary embodiment of the present invention, the target 50 is a waveguide, such as a light pipe, a tapered light pipe, single core optic fiber, a fused bundle of optic fibers, and a fiber bundle, as illustrated in FIG. 6. An input end of the target (e.g., a proximal end of the optic fiber) is positioned at the first focal point 34 of the second reflector 30 to receive the focused rays of electromagnetic radiation reflected by the second reflector 30.

When the optical collection and condensing systems of the present invention are applied to applications for illuminations or projection of an image, there is a need to homogenize the output intensity profile at the target such that the output is more uniform. For example, for illumination during a medical procedure such as endoscopy, it is desirable to have uniform illumination so that the doctor can observe areas in the center and the periphery of the illumination with equal clarity. In the case of illuminations using optical fibers, the uniform intensity allows higher power to be coupled to a particular fiber optic configuration without being damaged by hot spots. In the case of projections, the uniform intensity will be needed to produce a uniform intensity profile at the screen. In particular, it is desirable for visual aesthetics that the center and the periphery of the displayed image have equal level of illumination.

Figure 7A:
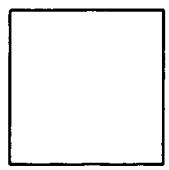
FIGS. 7a-7j are schematic views of a plurality of waveguide targets in cross-sections which may be employed in embodiments of the present invention.
Figure 7B:
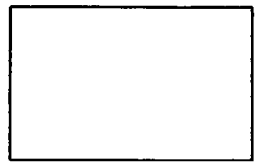
Figure 7C:
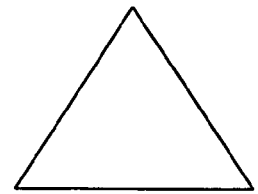
Figure 7D:
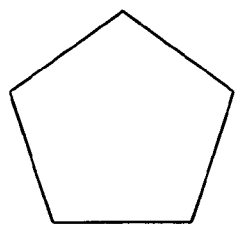
Figure 7E:
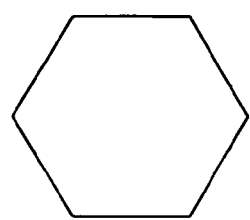
Figure 7F:
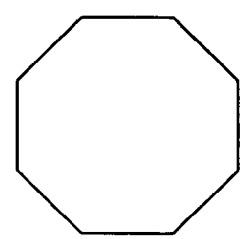
Figure 7G:
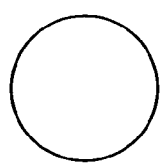
Figure 7H:
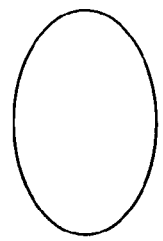

Accordingly, the target may be a homogenizer, as illustrated in FIG. 5 that adjusts the output intensity profile. The waveguide may be polygonal (square, rectangle, triangle, etc.) in cross-section as shown in as shown in FIGS. 7a-7f or rounded (circular, elliptical, etc.) in cross-section as shown in as shown in FIGS. 7g-7h.

Figure 7I:
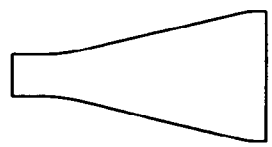
Figure 7J:
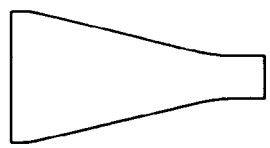

Depending on the output requirement in terms of numerical aperture and size, the homogenizer can be tapered from smaller to larger sizes or vice versa. Thus, the target 50 can be an increasing taper waveguide as shown in FIG. 7i, or a decreasing taper waveguide as shown in FIG. 7j. In this way, the homogenizer allows changes in the shape of the output of the illumination. For example in projection displays in which an image source 60 is placed in the output stream of the target 50 through a condenser lens 80 and a projection lens 90 to create a projected image 70, the ideal output of the homogenizer will be rectangular with a ratio of width-to-height of 4-to-3 or 16-to-9, or other ratios, depending on the format of the displays. Nevertheless, the angle of the illuminating radiation in both directions should be similar and such that a circular projection lens 90 can be used with the optical system efficiently.

While the target and the source are intimately associated with the collecting and condensing system of the present invention, in accordance with an exemplary embodiment of the present invention, the system relates to the use of two reflectors of slightly different size and/or shape arranged so as to share a single focal point (i.e., the second focal point 26 of the first reflector 20 and the second focal point 36 of the second reflector 30 are located substantially identical positions).

Continuing with the description of the collecting an condensing system, in the arrangements shown in FIGS. 5-6, the first reflector 20 and the second reflector 30 are positioned in an opposed, facing relation with respect to each other so as to be concave toward each other. Optical symmetry is achieved in the arrangements of FIGS. 5-6 by arranging the first reflector 20 and the second reflector 30 so that their respective optical axes 22 and 32 are collinear and so that the reflective surface of the first reflector 20 is an opposed, facing relation with the substantially corresponding reflecting surface of the second reflector 30 optimizing magnification.

Figure 4:
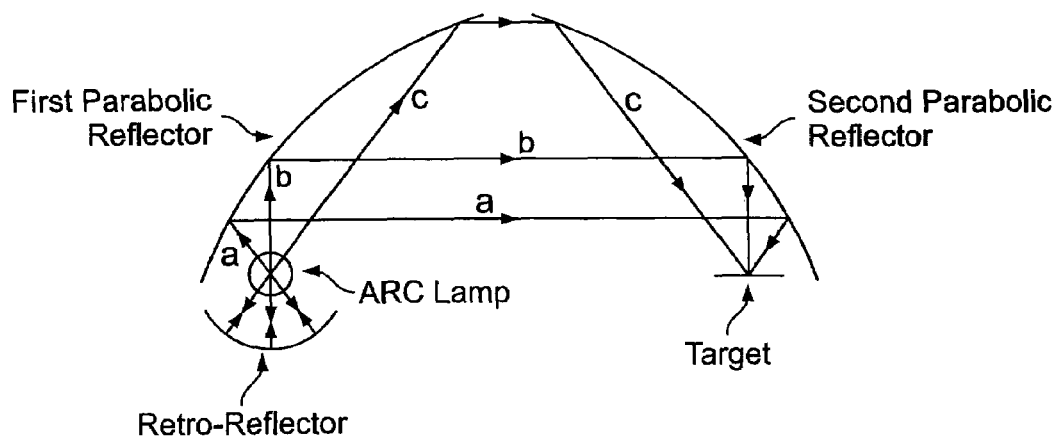
FIG. 4 is a schematic diagram, shown in cross-section, of a known on-axis condensing and collecting optical system that uses two paraboloid reflectors.

In FIGS. 5-6, three rays a, b, and c are drawn to illustrate the function of the reflectors in view of different possible paths for the electromagnetic radiation produced by the source 10. In FIGS. 5-6, the rays a, b, and c are in substantially the same positions as in FIG. 4 in order to illustrate the effectiveness of the present optical system in reducing aberration. Each of the rays a, b, and c emitted from the light source 10 impinges the first reflector 20 at a different point, each point having a different distance from source 10. But each of the rays a, b, and c is also focused onto the target 50 from a corresponding position of the second reflector 30, thus produces a substantially 1:1 magnification or slight magnification for the three rays.

As before, ray a has the shortest distance from the source 10 and the first reflector 20 and consequentially produces a larger divergence in comparison to rays b and c. With the optical system of the present invention, radiation from the light source is focused from the first focal point 24 of the first reflector 20 to the second point 26. As a result, the distances traveled by the radiation from the source 10, even those emitted at high angles such as ray a, is relatively larger than the corresponding distance in the system of FIG. 4 that uses paraboloid reflectors. The larger distance reduces the amount of aberration because the distances of rays a, b, and c are now relatively more uniform.

To reduce aberration even further, FIG. 6 shows an exemplary embodiment of the present invention in which the first and second reflectors 20' and 30' have greater eccentricity (i.e., the first and second reflectors are more circular). As a result of the greater curvature of the first and second reflectors 20' and 30' in this exemplary embodiment, the distance between the first focus 24' of the first reflector 20' and the first focus 34' of the second reflector 30' is reduced. At the same time, the greater curvature of the reflectors 20' and 30' increased the distance between the first reflector 20' and its first focus 24' along ray a. Likewise, the corresponding distance between the second reflector 30' and its first focus 34' along ray a is increased. As a result, the distances traveled between the radiation source 10' and the first reflector 20' (as well as the total distance between the source 10' and the target 50') for the rays a, b, and c in FIG. 6 are relatively more uniform in comparison to the embodiment of FIG. 5. This feature allows the system to produce less aberration between the light source and the target, even with electromagnetic energy traveling near the optical axis 22', such as energy traveling paths similar to ray a.

By comparing the path of the same ray c in FIGS. 5 and 6, it can be seen that the embodiment of FIG. 6 uses reflectors 20' and 30' covering a greater portion of an ellipsoid in order to collect the same angle of output radiation from the source 10. However, it can be seen that reflectors 20' and 30' in FIG. 6 have approximately the same diameter as reflectors 20' and 30' in FIG. 5.

As shown in FIGS. 5 and 6, the collecting and condensing system of the present invention may incorporate the use of a retro-reflector 40, which, in the illustrated embodiment, is a spherical retro-reflector. The retro-reflector 40 is positioned to capture electromagnetic radiation emitted by the source 10 that would not otherwise impinge on the first ellipsoidal reflector 20. More particularly, the spherical retro-reflector 40 is constructed and arranged so that radiation emitted by the source 10 in a direction away from the first reflector 20 is reflected by the retro-reflector 40 back through the first focal point 24 of the first reflector 20 and thereafter toward the first reflector 20. This additional radiation reflected by the first reflector 20 is added to the radiation that impinges the first reflector 20 directly from the source 10 to thereby increase the intensity of the radiation reflected toward the second reflector 30. Consequently, the intensity of the radiation at the first focal point 34 of the second reflector 30 is also increased.

If a filament lamp is employed as the source 10, the retro-reflector cannot be oriented so that it focuses radiation back through the first focal point 24 of the first reflector 20, because the retro-reflected radiation would be blocked by the opaque filaments located at the first focal point 24. In this case, the position of the retro-reflector 40 should be adjusted so that the retro-reflected radiation passes near but not precisely through the first focal point 24.

It should be appreciated that several different retro-reflectors 40 are known and may be employed in the present invention. For example, as an alternative to a spherical retro-reflector 40, the retro-reflecting function can be performed by a two-dimensional corner cube array (not shown) with unit elements sized on the order of the arc size of the source 10 or smaller. Employing a two-dimensional corner cube array eliminates the need for precisely positioning a retro-reflector and will produce a tighter focus at the arc of the source 10.

It should be further appreciated that, although the above embodiments describe configurations with first and second reflectors having an ellipsoidal or a parabolic shape, it is known and anticipated by the present invention that first and second reflector 20 and 30 may be approximated using shapes that are slightly different from an ideal geometric ellipsoid or paraboloid shape. For example, the first and second reflector 20 and 30 may have altered ellipsoidal or parabolic shapes to compensate of various parameters, such as bulb envelops, filters, etc. In this case, the deviation in the shape of the generally ellipsoidal or parabolic reflectors 20 and 30 can be small and the final output may be slightly different from the optimum. Deviations in the shape of the reflectors can also be introduced to reduce cost of the reflectors 20 and 30, or increase performance for particular lamp types and arc shapes. For example, it is known and anticipated by the present invention that reflectors 20 and 30 can be approximated by toroidal reflectors (having two perpendicular and unequal radii of curvature) or spherical reflectors, which can be manufactured at a lower relative cost. If non-ellipsoidal reflectors are used, the output coupling may not be optimum, but the reduced expense for the first and second reflectors 20 and 30 may be sufficient to justify the loss through the inefficient coupling.

Figure 8A:
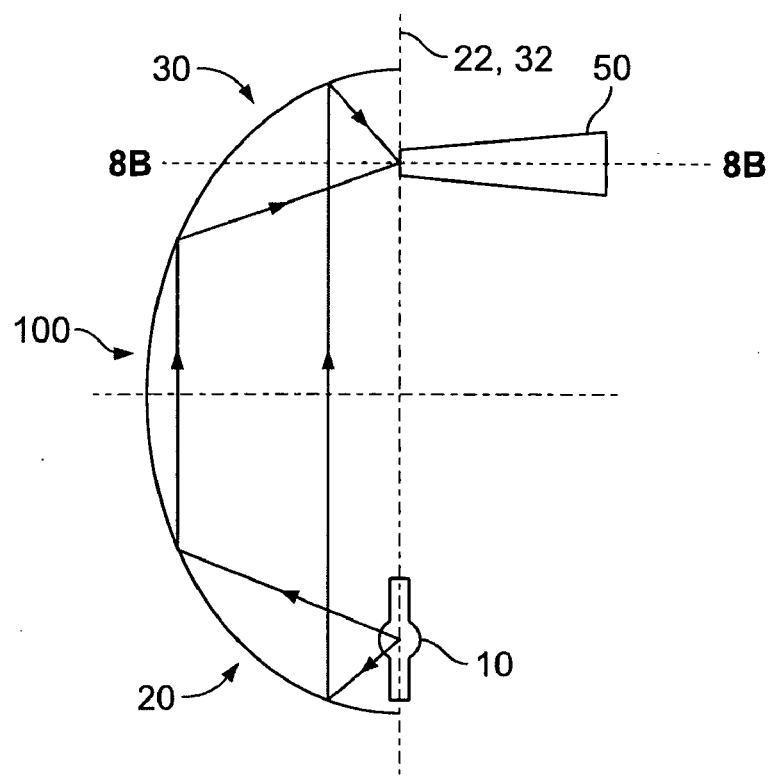
FIG. 8a is a schematic view of a dual paraboloid reflector system in accordance with an exemplary embodiment of the present invention.
Figure 8B:
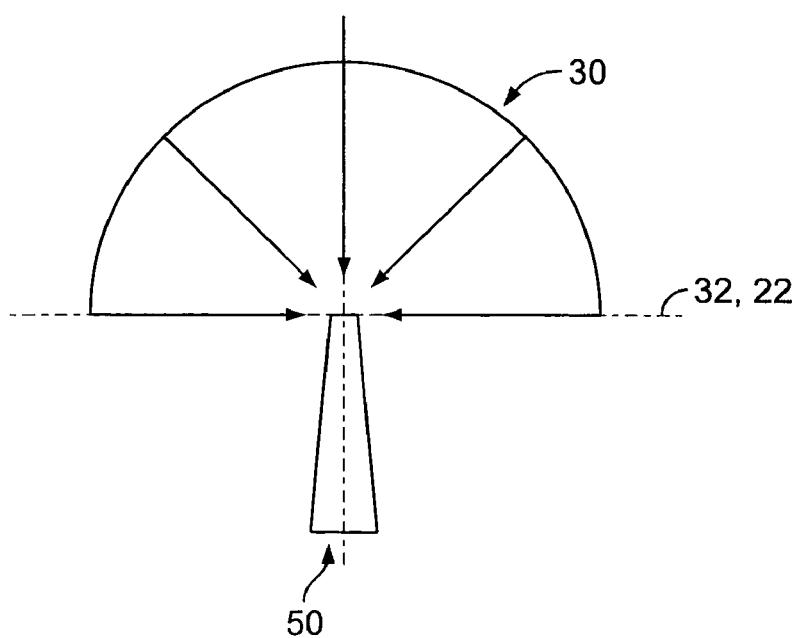
FIG. 8b is a schematic view of angles of incidences with a standard dual paraboloid reflector system.

In standard DPR system, the two reflectors are symmetric with respect to each other. The image of the arc is not generally distorted or become fuzzy as in elliptical or parabolic reflector systems. The coupling efficiency is higher especially for small etendue application. A characteristic of a standard DPR system is that the light entering the tapered light pipe or target 50 can be as high as ±90° as shown in FIG. 8b, which is a glazing angle in which the Fresnel reflection loss is high. Turning now to FIG. 8a, in accordance with an exemplary embodiment of the present invention, a dual paraboloid reflector (DPR) system 100 comprises a first reflector 20 and a second reflector 30, which are asymmetric with respect to each other. Alternatively, the first and second reflectors 20, 30 can be replaced with a single reflector having two sections of different shape and/or size. The asymmetric relationship of these two reflectors 20, 30 results in slight magnification, which introduces image distortion. But, the light or radiation inputted to the TLP 50 has smaller angles of incidences than standard DPR system, thereby maximizing net output coupling efficiency.

Figure 9A:
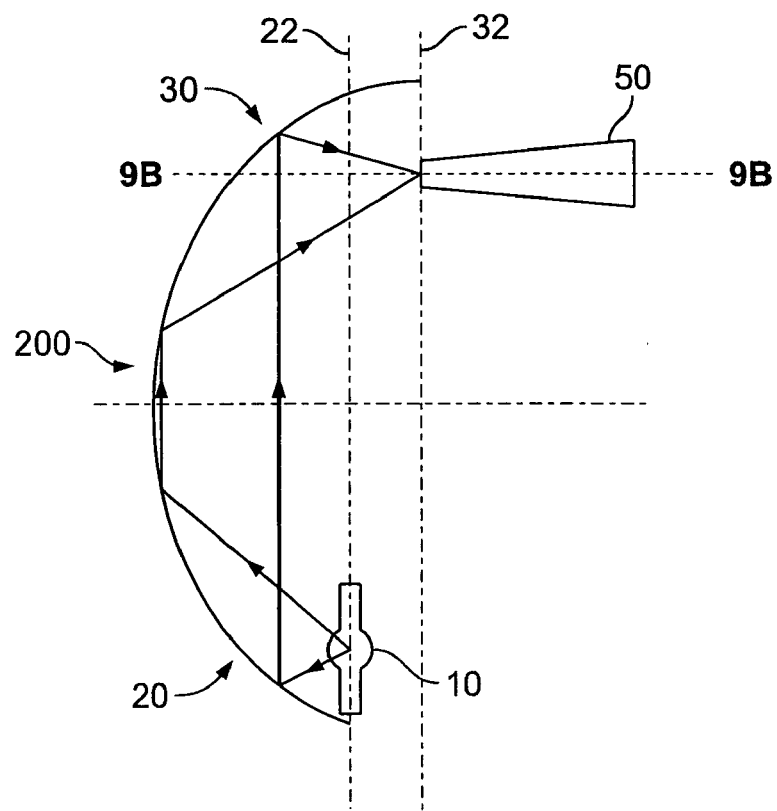
FIGS. 9a-9b are schematic views of a dual paraboloid or ellipsoidal reflector system in accordance with an exemplary embodiment of the present invention.

In accordance with an exemplary embodiment of the present invention, the DPR system 200 of FIG. 9a comprises the electromagnetic source 10, a first 20, a second reflector 30 and the TLP 50, wherein the two reflectors 20, 30 are asymmetric such that that slight magnification is applied. Alternatively, the first and second reflectors 20, 30 can be replaced with a single reflector having two sections of different shape and/or size. In accordance with an aspect of the present invention, the second reflector 30 is larger than the first reflector 20 and has longer focal length than the first flector 20. The slight magnification introduces a small amount of image distortion but the input light to the TLP 50 has smaller angles of incidence, thereby reducing the Fresnel loss.

Figure 9B:
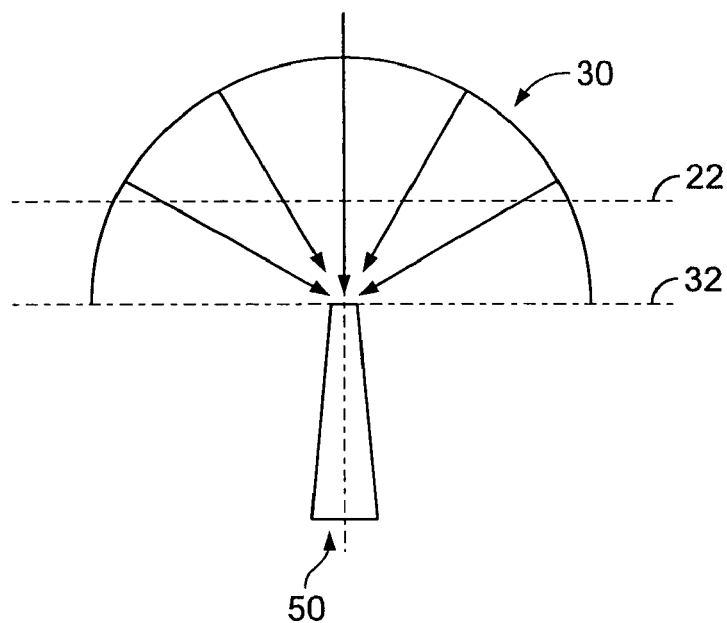

The first reflector 20 is preferably a parabolic reflector having optical axis 22 (or axis of focus 22) and the second reflector 30 is preferably a parabolic reflector having optical axis 32 (or axis of focus 32). The two axes 22, 32 are not coincident. The resultant light incidence onto the TLP 50 from the second reflector 30 is shown in FIG. 9b. When the output section or second reflector 30 is trimmed to the same focal plane 22 as the input section or first reflector 20, the axis of focus 32 of the output section or second reflector 30 will lie outside the DPR system 200, as shown in FIG. 9b. This advantageously result in incidence angle being smaller than ±90°, which reduces the effect of Fresnel reflection.

It is appreciated that the DPR 200 or dual elliptical reflector (DER) system 300 can be designed using ray tracing. The gain by reducing the Fresnel reflection in the present invention is partly lost by slight distortion of the image due to asymmetry of the DPR or DER system 200. As a result, the present system optimizes the tradeoff between the Fresnel reflection loss and the image aberration or distortion that maximizes the net output coupling efficiency.

Figure 10:
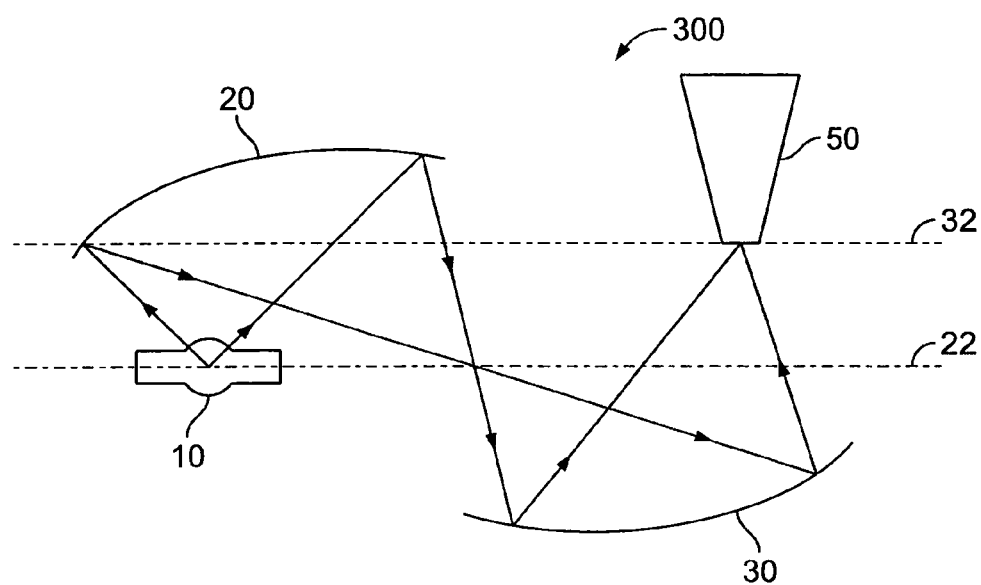
FIG. 10 is a schematic view of a dual paraboloid or ellipsoidal reflector system in accordance with an exemplary embodiment of the present invention.

In accordance with an exemplary embodiment of the present invention, the DER system 200 of FIG. 10 comprises the electromagnetic source 10, a first 20, a second reflector 30 and the TLP 50, wherein the two ellipsoidal reflectors 20, 30 are asymmetric such that that slight magnification is applied. In accordance with an aspect of the present invention, the second reflector 30 is larger than the first reflector 20 and has longer focal length than the first reflector 20. The slight magnification introduces a small amount of image distortion but the input light to the TLP 50 has smaller angles of incidence, thereby reducing the Fresnel loss.

The first reflector 20 is preferably an elliptical reflector having optical axis 22 (or axis of focus 22) and the second reflector 30 is preferably an elliptical reflector having optical axis 32 (or axis of focus 32). The two axes 22, 32 are not coincident. The resultant light incidence onto the TLP 50 from the second reflector 30 similar to those in FIG. 9b for the DPR system 200. When the output section or second reflector 30 is trimmed to the same focal plane 22 as the input section or first reflector 20, the axis of focus 32 of the output section or second reflector 30 will lie outside the DER system 300 (similar to those shown in FIG. 9b for the DPR system 200). This advantageously result in incidence angle being smaller than ±90°, which reduces the effect of Fresnel reflection.

Several examples of the present invention are now provided. These examples are meant to illustrate some possible implementations of the present invention but are not intended to limit the scope of the present invention.

EXAMPLES

A first pair of exemplary optical systems in accordance with the present invention uses a low wattage lamp, in the order of 100 Watts, as the lights source. In a reflection system in accordance with the embodiment of FIG. 5, each of the first and second reflectors has a diameter of 2.5 inches, and the separation between the source and target (i.e., the distance between the foci) is about 5 inches. In contrast, a low wattage reflection system of greater eccentricity in accordance with the embodiment illustrated in FIG. 6 uses first and second reflectors of similar size, each having diameter of approximately 2.5 inches, but has a distance between the source and target of approximately 2 inches.

In higher wattage applications, the optical system is relatively larger to provide desirable collection of the higher electromagnetic energy levels and to accommodate the potentially larger lamps. For example, when using a high wattage lamp, on the order of 5,000 Watts with the configuration of FIG. 5, each of the primary reflectors has a diameter of 20 inches, and the separation between the source and the target is about 40 inches. As before, the embodiment of FIG. 6 uses primary reflectors of similar size but results in a reduced distance between the source and target. For instance, an exemplary high wattage optical system in accordance with embodiment of the FIG. 6, also uses first and second reflectors with a diameter of approximately 20 inches but has a distance between of the source and target of 16 inches.

The invention, having been described, it will be apparent to those skilled in the art that the same may be varied in many ways without departing from the spirit and scope of the invention. Any and all such modifications are intended to be included within the scope of the following claims.

What is claimed is:

1. An optical device for illuminating a target with rays of electromagnetic radiation comprising:
    a first reflector comprising a first optical axis, and a first focal point on said first optical axis, said rays of electromagnetic radiation being directed substantially proximate to said first focal point of said first reflector; and
    a second reflector comprising a second optical axis, and a second focal point on said second optical axis, said second reflector being positioned and oriented with respect to said first reflector to receive at least a portion of the rays of radiation reflected from said first reflector and reflect said portion of said rays of radiation to a target located substantially proximate to said second focal point of said second reflector, said second reflector being asymmetric with respect to said first reflector; and wherein said first and second optical axes are substantially parallel with each other.

2. The optical device of claim 1, wherein said first reflector has a first focal length and wherein said second reflector has a second focal length which is different from said first focal length.

3. The optical device of claim 2, wherein said second focal length of said second reflector is longer than said first focal length of said first reflector, which lowers the incidence angle of said rays of radiation inputted to said target.

4. The optical device of claim 2, wherein the focal length difference between said first focal length and said second focal length is selected to optimize the tradeoff between Fresnel reflection loss and image aberration.

5. The optical device of claim 2, wherein said first and second reflectors are arranged in an opposed, facing relation with respect to each other.

6. The optical device of claim 1, wherein asymmetric characteristics of said first and second reflectors are selected to maximize net output coupling efficiency.

7. The optical device of claim 1, wherein each of said first and said second reflectors comprises at least a portion of a substantial paraboloid of revolution.

8. The optical device of claim 1, wherein each of said first and said second reflectors comprises at least a portion of a substantial ellipsoid of revolution or toroid of revolution.

9. The optical device of claim 1, wherein said second optical axis is not coincident with said first optical axis.

10. The optical device of claim 1, wherein a portion of said rays of electromagnetic radiation impinges directly on said first reflector and a portion of the electromagnetic radiation does not impinge directly on said first reflector and wherein said device further comprise an additional reflector constructed and arranged to reflect at least part of the portion of the electromagnetic radiation that does not impinge directly on said first reflector toward said first reflector through the first focal point of said first reflector to increase the flux intensity of the converging rays.

11. The optical device of claim 10, wherein said additional reflector comprises a spherical retro-reflector disposed on a side of said first focal point of said first reflector opposite said first reflector to reflect electromagnetic radiation emitted away from said first reflector toward said first reflector through the first focal point of said first reflector.

12. The optical device of claim 1, further comprising an image source illuminated by the radiation collected and condensed at said target, wherein said image source contains a stored image and said stored image is projected by the radiation.

13. The optical device of claim 1, wherein the first and the second reflectors each have diameter that is substantially greater than a distance between the first focal point of said first reflector and the target.

14. The optical device of claim 1, wherein said target is a tapered light guide.

15. An optical device for illuminating a target with rays of electromagnetic radiation comprising:

a first reflector comprising a first optical axis, and first and second focal points on said first optical axis, said rays of electromagnetic radiation being directed substantially proximate to said first focal point of said first reflector to reflect from said first reflector and substantially converge at said second focal point; and a second reflector comprising a second optical axis, and first and second focal points on said second optical axis a target being located substantially proximate to said first focal point of said second reflector to receive at least a portion of said rays of radiation that pass through said second focal point of said second reflector and are reflected by said second reflector to substantially converge at said first focal point of said second reflector, said second reflector being positioned and oriented with respect to said first reflector such that said second focal point of said first reflector arid said second focal point of said second reflector are positioned substantially proximate, said second reflector being asymmetric with respect to said first reflector; and wherein said first and second optical axes are substantially parallel with each other.

16. The optical device of claim 15, wherein said first reflector has a first focal length and wherein said second reflector has a second focal length which is different from said first focal length.

17. The optical device of claim 16, wherein said second focal length of said second reflector is longer than said first focal length of said first reflector, which lowers the incidence angle of said rays of radiation inputted to said target.

18. The optical device of claim 16, wherein the focal length difference between said first focal length and said second focal length is selected to optimize the tradeoff between Fresnel reflection loss and image aberration.

19. The optical device of claim 16, wherein said first and second reflectors are arranged in an opposed, facing relation with respect to each other.

20. The optical device of claim 15, wherein asymmetric characteristics of said first and second reflectors are selected to maximize net output coupling efficiency.

21. The optical device of claim 15, wherein each of said first and said second reflectors comprises at least a portion of a substantial paraboloid of revolution.

22. The optical device of claim 15, wherein each of said first and said second reflectors comprises at least a portion of a substantial ellipsoid of revolution or toroid of revolution.

23. The optical device of claim 15, wherein said second optical axis is not coincident with said first optical axis.

24. The optical device of claim 15, wherein a portion of said rays of electromagnetic radiation impinges directly on said first reflector and a portion of the electromagnetic radiation does not impinge directly on said first reflector and wherein said device further comprise an additional reflector constructed and arranged to reflect at least part of the portion of the electromagnetic radiation that does not impinge directly on said first reflector toward said first reflector through the first focal point of said first reflector to increase the flux intensity of the converging rays.

25. The optical device of claim 24, wherein said additional reflector comprises a spherical retro-reflector disposed on a side of said first focal point of said first reflector opposite said first reflector to reflect electromagnetic radiation emitted away from said first reflector toward said first reflector through the first focal point of said first reflector.

26. The optical device of claim 15, further comprising an image source illuminated by the radiation collected and condensed at said target, wherein said image source contains a stored image and said stored image is projected by the radiation.

27. The optical device of claim 15, wherein the first and the second reflectors each have diameter that is substantially greater than a distance between the first focal point of said first reflector and the target.

28. The optical device of claim 15, wherein said target is a tapered light guide.

29. A method for collecting rays of electromagnetic radiation and focusing the collected rays of electromagnetic radiation onto a target, said method comprising the steps of:

- directing said rays of electromagnetic radiation substantially proximate to a focal point on a first optical axis of a first reflector;
- positioning and orienting a second reflector with respect to said first reflector to receive at least a portion of said rays of radiation reflected from said first reflector; and
- positioning said target proximate to a focal point on a second optical axis of said second reflector to receive said at least portion of said rays of radiation reflected from said second reflector, wherein said second reflector being asymmetric with respect to said first reflector to optimize net output coupling efficiency and wherein said first and second optical axes are substantially parallel with each other.

30. The method of claim 29, further comprising the step of decreasing the incidence angle of said rays of radiation inputted to said target.

31. The method of claim 29, further comprising the step of selecting asymmetric characteristics of said first and second reflectors to maximize net output coupling efficiency.

32. The method of claim 29, further comprising the step of optimizing the tradeoff between Fresnel reflection loss and image aberration to provide a maximum net output coupling efficiency.

33. A method for collecting rays of electromagnetic radiation and focusing the collected rays of electromagnetic radiation onto a target, said method comprising the steps of:

- directing said rays of electromagnetic radiation substantially proximate to a first focal point on a first optical axis of a first reflector so that said first reflector substantially converges said rays of radiation reflected from said first reflector at a second focal point on said first optical axis;
- positioning a second reflector so that a first focal point on a second optical axis of the second reflector is substantially proximate with the second focal point of the first reflector, whereby the converging rays of radiation reflected from said first reflector pass through the first focal point of the first reflector and are redirected by said second reflector toward a second focal point on said second optical axis; and
- positioning the target proximate to the second focal point of said second reflector, wherein said second reflector being asymmetric with respect to said first reflector to effectively reduce Fresnel reflection loss; and
- wherein said first and second optical axes are substantially parallel with each other.

34. The method of claim 33, further comprising the step of decreasing the incidence angle of said rays of radiation inputted to said target.

35. The method of claim 33, further comprising the step of selecting asymmetric characteristics of said first and second reflectors to maximize net output coupling efficiency.

36. The method of claim 33, further comprising the step of optimizing the tradeoff between Fresnel reflection loss and image aberration to provide a maximum net output coupling efficiency.

* * * * *

UNITED STATES PATENT AND TRADEMARK OFFICE
CERTIFICATE OF CORRECTION

| | |
|---|---|
| PATENT NO. | : 7,631,989 B2 |
| APPLICATION NO. | : 11/479032 |
| DATED | : December 15, 2009 |
| INVENTOR(S) | : Kenneth K. Li |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 66 days.

Signed and Sealed this

Second Day of November, 2010

David J. Kappos
*Director of the United States Patent and Trademark Office*